UNITED STATES PATENT OFFICE.

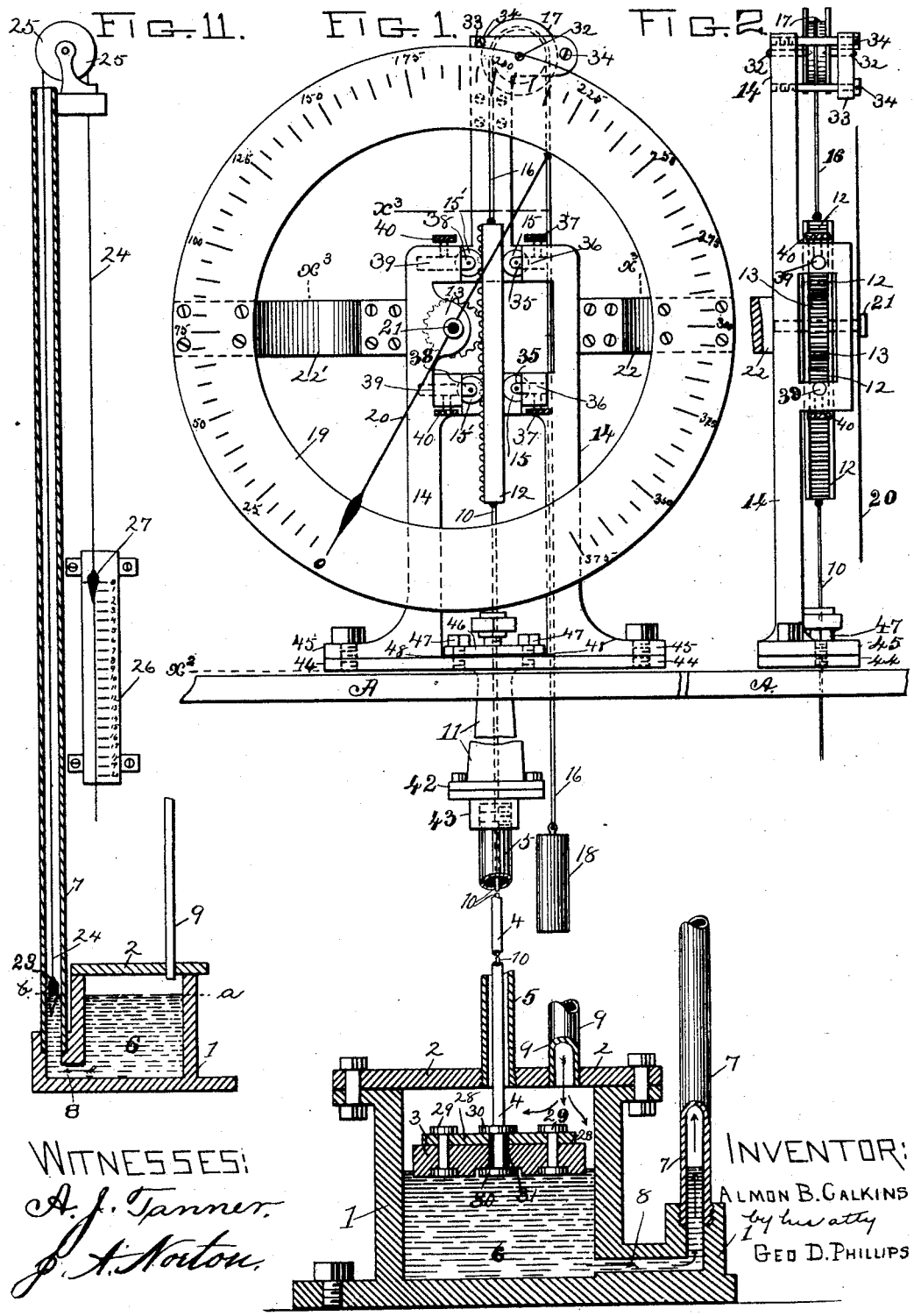

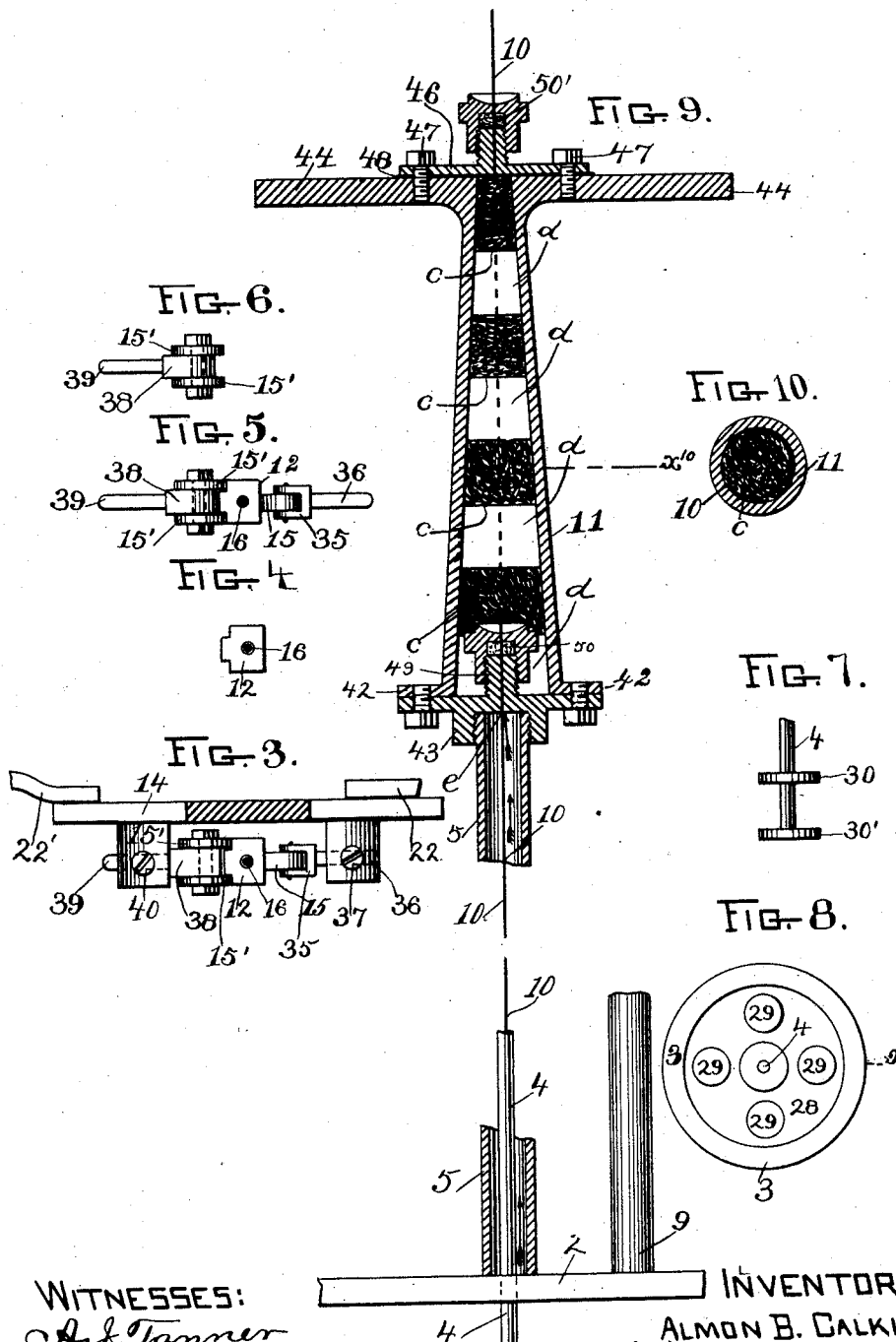

ALMON B. CALKINS, OF NEW YORK, N. Y., ASSIGNOR OF ONE-HALF TO FERRAL C. DININNY, JR., OF SAME PLACE.

MERCURY COLUMN FOR ASCERTAINING PRESSURES.

SPECIFICATION forming part of Letters Patent No. 469,960, dated March 1, 1892.
Application filed April 8, 1891. Serial No. 388,141. (No model.)

*To all whom it may concern:*

Be it known that I, ALMON B. CALKINS, a citizen of the United States, and a resident of New York, in the county of New York and State of New York, have invented certain new and useful Improvements in Mercury Columns, of which the following is a specification.

My invention relates to mercury columns, an instrument used to establish by the heights of mercury in a tube under varying pressure equivalents, and thereby rate the exact value of a pressure.

Heretofore to ascertain the height of the mercury in a tube to represent a pressure equivalent an iron float or other substance whose specific gravity is less than that of mercury is placed on the mercury within the tube and the bottom of such tube is connected with a reservoir, the area of such reservoir being greater than the area of the tube. A pressure on the larger body of mercury in the reservoir will cause the same to flow up the tube and carry the float with it. As the tube is made of steel or iron, its interior cannot be seen. Therefore to ascertain the exact position of the float within such tube, which position will represent the height of mercury in column, a fine line is attached to the float, passing upward therefrom through the open mouth of the tube and over a wheel, and thence down to the operator. A linear scale representing pounds is placed near the tube. Upon the line or cord outside the tube is placed a pointer arranged to be shifted thereon, which pointer moves down the scale, representing on such scale the height of the mercury within the tube. As the scale must necessarily be circumscribed in its length, so as to be within the visual range of the operator, and such distance being about forty inches, an equivalent of twenty pounds, it is necessary, therefore, for every twenty pounds representing the length of the scale to carry the pointer on the cord back to zero, or the upper part of the scale for a second reading of twenty pounds, and so on, up to the number of pounds required. This frequent shifting of the pointer opens the way for errors, which errors are multiplied every time the pointer is moved back on the cord, so that in summing up the total pressure represented by the length of the scale it is impossible to reach any degree of accuracy. Add to this the stretching of the long cord, and the friction of the same over the pulley, also the friction of the float against the sides of the tube, all combined, render this construction faulty in the extreme.

The object of my invention is to so improve the mercury column that the errors now existing may be entirely eradicated and an accurate, continuous, and uninterrupted reading obtained.

To this end my invention consists in utilizing the displacement of the larger body of mercury in the reservoir. (Which displacement varies as the area—*i. e.*, the greater the area the less will be the displacement or distance moved through by the mercury.) As a means for representing equivalents of pressures, the small amount of displacement permits of a continuous reading of the height of mercury in the small tube and the equivalent of such height in pounds upon a dial. To accomplish this I place a float upon the mercury in the reservoir and connect therewith a fine wire, and at any convenient distance above the reservoir I connect the other end of such wire to a toothed rack. To the opposite end of such rack another piece of fine wire or thin steel ribbon is attached, which passes over a frictionless pulley, and from its free end is suspended a weight sufficient to always keep the wire taut and balance the float in the reservoir, a toothed pinion engaging the rack, the shaft or spindle of such pinion carrying an indicating hand or pointer, such hand arranged by the movement of the rack and pinion to travel around a dial bearing upon its face the graduations representing the equivalents in pounds of the height of the mercury in the tube through the displacement of the volume of mercury in the reservoir.

My invention further consists in the arrangement of construction whereby the water under the pressure applied to the mercury is retained in the reservoir and prevented from following up the wire leading from the float to the rack. This is accomplished by passing the wire through a chamber closely packed with oleaginous substance, such chamber being of sufficient length, and the oleaginous substance, which is susceptible of compression into almost a solid body, will effectually prevent the water tracking through it, while the lubricating qualities of the oleaginous packing will permit the small wire to pass through without friction, all of which improvements will be more fully described in the specification, and particularly pointed out in the claims.

To more fully understand my invention reference is had to the accompanying drawings, and to the figures and letters of reference marked thereon, which drawings form a part of this specification.

Figure 1 represents a front elevation of my improved device, showing the recording-dial, the mechanism connected therewith, a sectional view of the mercury-reservoir and float therein, broken view, partly in section, of the water and mercury pipes leading from such reservoir, also broken view, partly in section, of the pipe connecting the mercury-reservoir with the wire packing chamber. Fig. 2 represents an end elevation through line $X^2$ of Fig. 1. Fig. 3 represents a plan of the supporting-standard for the rack-and-pinion mechanism and dial-supporting arms through lines $X^3$ of Fig. 1. Figs. 4, 5, 6, 7, and 8 represent detail views. Fig. 9 represents a sectional view of the oleaginous packing case or box for the wire leading from the float, also sectional view of the pipe leading from the mercury-reservoir to the packing box or case, also broken section of water-pipe and cover of the mercury-reservoir. Fig. 10 represents a section through line $X^{10}$ of Fig. 9. Fig. 11 represents the present method of constructing mercury columns.

Its construction and mode of operation are as follows:

1 represents the mercury-reservoir; 2, its cover; 3, the float; 4, the float-rod; 5, pipe inclosing the float-rod; 6, body of mercury within reservoir 1; 7, the mercury-tube attached to the reservoir; 8, passage leading from the reservoir 1 to the interior of the mercury-tube 7; 9, water-pressure pipe attached to the reservoir-cover 2 and communicating with the interior of the reservoir; 10, small wire attached to the float-rod 4; 11, packing-case filled with oleaginous matter through which wire 10 passes; 12, toothed rack attached to wire 10; 13, pinion engaging with the rack 12; 14, frame supporting the rack and pinion; 15 15', rolls connected to frame 14, such rolls operating as an anti-friction support for rack 12; 16, wire or steel ribbon attached to the upper end of rack 12; 17, pulley journaled in frame 14, over which pulley wire 16 passes; 18, weight attached to the end of wire 16; 19, graduated dial; 20, indicating hand or pointer attached to spindle 21 of the pinion 13; 22 22', arms supporting dial 19 to the frame 14.

The advantages to be derived from my improved device can be better appreciated by comparing it with the present method of rating the value of pressure by the heights of mercury.

Referring to Fig. 11, which is a sectional elevation of the reservoir and tube, the mercury-reservoir 1 is represented as containing a body of mercury up to the line $a$, which line represents its normal position or zero. This zero is also represented by line $b$ in the tube 7. This mercury-tube usually exceeds fifty feet in height, so that a pressure of three hundred pounds can be obtained. A greater pressure would of course necessitate a corresponding increase in the height of the tube.

On the mercury in the tube is the metal float 23, to which is attached the fine cord 24. This cord passes over the pulley 25 at the top of the tube 7, thence down the outside of such tube to the scale 26, which scale is attached rigidly to the wall or other convenient place. Attached to the cord 24 is the pointer 27, arranged to be moved up and down on such cord at the will of the operator. The pointer 27 lies against the face of the graduated scale 26. The scale is usually placed a few feet above the reservoir, such scale showing twenty graduations, representing twenty pounds, this being about the limit that will permit the operator to see when the pointer coincides exactly with all of the graduations. A pump (not shown) connects with the pipe 9. A pressure of water on the mercury in the reservoir 1 will force such mercury through the channel 8 and up the tube 7, carrying float 23 with it. This will cause the pointer 27 to move down the face of the scale 26 a distance represented by the height of the mercury in tube 7. When the the pointer has reached twenty pounds (being the limit of the scale) and a higher pressure is required, such pointer must be moved up the line 24 until it stands again at zero. Then a second reading of twenty pounds will be taken, as before, and so on up to the limit of the pipe, making it necessary to shift the float fifteen times in obtaining a reading of three hundred pounds—i. e., the pointer 24 will have to move approximately through the same space that the float does in the tube 7 to represent a pressure equivalent to the height of the float in such tube. It is necessary after the pointer has reached the twenty-pound mark and the record noted to reset the pointer back to zero as quickly as possible. Any leakage of the pump would relieve the pressure on the mercury, which is sustained in column by such pressure, causing it to fall in the tube, and there being no means of determining the distance it has fallen during the time consumed in shifting from the twenty-pound mark to zero, it is evident that in starting again at zero an error exists which is carried all through the test, and when each shift or change of the pointer contains an error, which added to the number of times such pointer is shifted, combined with errors arising from the friction of the float against the walls of the mercury-tube as it ascends therein, and the stretch in one hundred or more feet of cord, will make an aggregation of errors that can neither be rectified nor accounted for. Besides, this device requires at least two operators, one to manipulate the pump and watch the float and the other to take the readings and shift the pointer.

The principle employed in a device of this kind is the only correct one recognized—viz., determining the value of pressure by the height of mercury. As the instrument is employed in testing steam gages, indicators, and such like instruments for recording pressures, accuracy is of the highest importance. As a column of mercury 2.036 inches in height will equal one pound, it is evident that for three hundred pounds the mercury and float would have to rise in the tube 610.803 inches. The diameter of the tube being five-eighths of an inch and the diameter of the reservoir six inches, the fall or displacement of the mercury in the reservoir necessary to fill the tube to a distance of 610.803 inches in height would only be about six inches. Therefore I employ this fall or displacement of mercury in the reservoir as the medium of motion whereby the height of mercury in the tube is represented by a continuous reading on a graduated dial. To accomplish this I place the float 3 upon the surface of the mercury in the reservoir 1. (See Fig. 1, which shows a section of the float through X' of Fig. 8, which latter view represents a plan of such float.) The float is constructed, preferably, of the circular block of wood 3, saturated with shellac or other like substance. Upon such wooden block or disk is placed the iron weighting-plate 28, which plate is secured to the wooden disk by means of the rivets 29, The float is placed between the shoulders 30 30' of the rod 4. (See also Fig. 7.) The central hole 31 of the float is made larger than rod 4 to give such float sufficient lateral movement to adjust itself to the surface of the mercury and not cramp the rod 4. To the rod 4, a short distance outside of the reservoir 1, is attached the small wire 10, the upper end of which wire is secured to the lower end of the rack 12. To the upper end of rack 12 is attached the thin steel ribbon or wire 16, (as the case may be,) such wire passing over the pulley 17, mounted and nicely balanced on the finely-pointed screws 32, (see also Fig. 2,) which screws are adjustably secured, one in the front plate 33 and the other in the frame 14, such front plate being secured to frame 14 by the screws 34. To the free end of the wire or ribbon 16, suspended from pulley 17, is attached the weight 18, such weight being sufficiently heavy, so as to act as a counter-balance to the float, keeping such float in a constant position and under a constant strain, thereby taking care of all lost motion occurring between the rack and its pinion and any slackness between the float and such weight, the float in the reservoir being heavy enough to assert itself against the influence of the weight and friction of all the mechanism connected with the instrument—i. e., to maintain its normal depth in the mercury.

To render the rack frictionless in its movements, I employ the rolls 15 15', such rack passing between the same. The rolls 15, engaging with the back of the rack 12, are each placed (see also plan of rack and roll, Fig. 5) within the forked heads 35 and mounted freely on a pin situated transversely through such head. Shanks 36 enter holes in the frame 14, and are arranged to be adjusted to and from the rack, and when so adjusted are secured by the screws 37. (See also Figs. 1 and 3.) The four rolls 15'—two on each side of the rack—are loosely mounted on pins projecting through heads 38. Shanks 39 of such heads are situated in the frame 14 and secured there when properly adjusted by means of screws 40. The pinion 13, engaging with the rack, is rigidly mounted on the spindle or shaft 21, (see Figs. 1 and 2,) and such spindle is journaled on holes or bearings in the frame 14. Upon the projecting end of shaft 21 is placed the indicating hand or pointer 20. Attached to arms 22 of frame 14 is the dial 19, graduated to three hundred and seventy-five pounds. Thus from the above construction it will be readily seen whereby a long and continuous reading is obtained from a small amount of displacement of the mercury in the reservoir, and by so doing avoid all those errors arising from readings taken from a float placed in the mercury-tube.

The water-pressure needed to force the mercury up the tube 7 is supplied from a pump situated near the dial (not shown) and enters the reservoir through the pipe 9. Such pressure being equal in all directions, it will also follow up the pipe 5, which incloses the rod 4 and a portion of the wire 10. As the force of the water at the high pressures represents several hundred pounds per square inch and any leakage would vitiate the readings, it is of the utmost importance that the water should be securely confined within prescribed limits, not one drop being allowed to escape. To accomplish this I employ a casing or tube (see Fig. 9) fifteen or twenty inches in length, more or less, as may be required, and construct it as follows: The casing or shell 11 is made, preferably, tapered, the lower end having flange 42, which is bolted to the flange of the cap 43, which cap is attached to the upper threaded end of the pipe 5. The large upper flange 44 of the casing supports the flange portion 45 of the frame 14, (see also Fig. 1,) and in fact, supports the whole mechanism situated above the table A. The flanged stuffing-box 46 is secured to flange 44 by bolts 47. Packing 48 is placed between the flanges of the casing and stuffing-box 46. The lower stuffing-box 49 is also mounted upon the cap 43. The interior of the packing-box case 11 is filled with an oleaginous substance that will repel water and yet possess the necessary lubricating qualities for the wire 10. I have found fresh lard and vaseline placed in alternate layers the best for this purpose, the dark shading c representing vaseline and the light unshaded portion d the lard, the lard and vaseline, though both oleaginous substances and resembling each other in many respects, each possessing in a greater or less degree those qualities necessary for this purpose, and yet they will not mix or commingle, maintaining their individuality under pressure—i. e., one body will not be forced into or through the other, and yet the effective pressure of the water will be felt or communicated throughout the whole mass, moving and compressing the entire body composed of both substances simultaneously. This will prevent the water forcing its way up the wire to any great extent. The passage-ways for the wire 10 in the stuffing-boxes at each end of the oleaginous packing-case are made no larger than will permit such wire to pass through freely without coming in contact with the metallic portion of such boxes, which contact would cause friction on the wire. The oleaginous substance is firmly packed in the case 11, which, as before mentioned, is tapered, its diameter decreasing toward the top. The water under the pressure from the pump will follow up the pipe 5 in the direction of the arrows, and will also be forced through the first stuffing-box at the point e, following up the wire 10. What water is thus admitted through such passage to the interior of the packing-case 11 is met by the resistance of the vast body of oleaginous substance within the case. The pressure of the water, acting upon the oleaginous substance, will have a tendency to force such substance toward the small end of the packing-case, still further compressing it therein, and by so doing increasing its resistance as the pressure increases, so that the water will soon meet a solid wall, through which it cannot penetrate. The lubricating and yielding qualities of the oleaginous substance being such that no resistance or friction is brought to bear upon the small wire 10, which wire is made as small as the circumstance of the case will allow, while such oleaginous substance will act as a repellent to the water.

The stuffing-boxes are provided with the woolen packing 50 50' or other substance that may be suitable to clean the wire 10 as it emerges from the packing-chamber. This cleaning material must not be packed tightly about such wire so as to produce friction, but come in contact therewith only to clean it.

When the necessary reading on the dial has been taken, the pressure on the mercury in the reservoir is released by opening a valve, when the mercury will fall in the tube 7 and rise in the reservoir to its normal or zero point. The float in such reservoir will also be carried up with the mercury. The weight 18 will descend, taking up all lost motion, as before mentioned, between such weight and the float.

To establish on the face of the dial from zero the line representing the maximum pressure of three hundred and seventy-five pounds, the instrument must be put together and ready to operate. Previous to this, however, the tube 7 is measured in its length into exact known distances by means of a needle-pointed vernier and marks on the surface of such pipe at intervals representing such distances. This is done to obtain an exact linear distance to show the exact position of the mercury at the maximum height in the tube for its equivalent of pressure on the dial. This pressure being, as before mentioned, three hundred and seventy-five pounds, the linear distance on the tube of a column of mercury to represent that pressure would be 375 multiplied by 2.036 (which represents the height of mercury for one pound, as before mentioned) equals 763.5 inches above the zero-point; but as zero varies proportional to its fall a correction in this distance for that fall would have to be made to show the relative volumes of the reservoir and tube, and as that relative volume is, so the fall will be. Suppose the fall in the reservoir to be 4.25 inches from zero to carry the mercury up the tube to show 763.5 inches. Then the corrected height or the height to which mercury would have to be elevated would be 763.5 inches less 4.25 inches, which would equal 759.25 inches from zero, this latter distance being accurately measured on the tube and the mercury forced up to that height, so that when this point or height is reached the exact position of the pointer on the dial is also marked, and this mark will represent three hundred and seventy-five pounds per square inch or the maximum pressure. Now as the mechanism is directly in time with the mercury, and the mercury in its height varies for pressure directly as the pressure, it is obvious that all pressures from zero to three hundred and seventy-five pounds would be represented by equal subdivisions on the circle through which the pointer would pass.

The advantages derived from the improvements set forth in the above construction are manifestly in favor of such a construction over the old and present method, the instrument requiring but one operator, and is free from all those disturbing influences that tend so largely to vitiate results.

Having thus described my invention, what I claim as new, and desire to secure by Letters Patent, is—

1. As an improvement in mercury columns of the character described and for the purpose set forth, the combination, with a reservoir containing a body of mercury, of a tube connected therewith and projecting therefrom, and means, substantially as shown, for applying water-pressure to the upper surface of the mercury in such reservoir, so that under the influence of such pressure the mercury is displaced in the reservoir and caused to ascend the tube, with a float placed upon the mercury in the reservoir and arranged to move in time with such mercury, and recording mechanism connected with such float, whereby the value or equivalent of the height of the mercury in the tube is recorded by the mechanism connected to such float.

2. The combination, in a mercury column, of a mercury-reservoir, a tube connected therewith and projecting therefrom in the manner substantially as shown, the diameter of which tube is less than the diameter of the reservoir, and means, substantially as shown, for applying pressure to the mercury in such reservoir, with a float resting on the surface of the mercury in the reservoir, a counter-balance for such float, such counter-balance placed outside the reservoir, and means, substantially as shown, to connect such counter-balance with the float, a toothed rack placed intermediate between and connected with such float and counter-balance, substantially as shown, a toothed pinion engaging the rack, a support for such pinion, a graduated dial, a support for the same, and a pointer or indicating hand connected with and controlled by the pinion, all arranged to be operated in the manner and for the purpose set forth.

3. The combination, in a mercury column of the character described, of a mercury-reservoir having a tube connected therewith in the manner substantially as shown, the diameter of which tube is less than the diameter of the reservoir, and means, substantially as shown and described, for applying pressure to the mercury within the reservoir, causing it to ascend such tube, with a float balanced in the mercury within the reservoir, a toothed rack, guides for such rack, a wire connecting one end of such rack with the float, a tube or shell through which such wire passes, such tube or shell filled with an oleaginous substance to act as a packing for such wire against the pressure of water from the reservoir, a counter-balance connected to the upper end of the rack, such counter-balance supported and arranged, substantially as shown, to take up all lost motion between the float and counter-balance, a toothed pinion engaging the rack, a support for such pinion, an indicating-hand or pointer connected with said pinion, substantially as shown, and a graduated dial for such hand, so that through the medium of the float, acting with the moving body of mercury in the reservoir, the height which such mercury rises in the tube will be registered on the dial, as set forth.

4. A packing-box having a chamber filled with an oleaginous substance for packing, and a rod or wire passing through such chamber, such wire surrounded by the oleaginous substance, such chamber having closed ends except for the passage of the wire, such oleaginous substance arranged to resist the pressure of water and prevent such water flowing through the packing-chamber, as set forth.

5. In a mercury column of the character described, the combination, with a mercury-reservoir and a tube connected therewith in the manner substantially as arranged and shown, so that the mercury forced from the reservoir will ascend the tube under the pressure of water admitted to such reservoir, substantially as shown, of a float, a wire or rod connecting such float with suitable mechanism for recording the height of mercury in the tube, and a packing box or case connected to the reservoir, substantially as shown, such packing box or case filled with an oleaginous substance through which the wire passes, such oleaginous substance surrounding the wire and resisting thereby the pressure of the water from the reservoir, effectually preventing such water passing through the oleaginous packing-chamber, as set forth.

6. The combination, in a mercury column of the character described, of a mercury-reservoir, a float therein, substantially as shown, a counter-balance connected with such float, a toothed rack connected with and suspended between such float and counter-balance, such rack actuated and controlled by such float and counter-balance, an oleaginous packing-chamber through which the wire connecting the rack with the float passes, such packing-chamber having closed ends except for the passage of such wire, and means, substantially as shown, for connecting the lower end of such packing-chamber with the reservoir, a toothed pinion engaging with the rack, a support for such pinion, an indicating-hand connected with such rack, and a graduated dial for such hand, all arranged as set forth.

7. The combination, in a mercury column of the character described, of a reservoir for the mercury, and a tube connected therewith in the manner substantially as shown and arranged, so that the mercury forced from such reservoir will ascend the tube under a pressure of water admitted to the reservoir, substantially as shown, with a float within the reservoir, such float arranged to move in time with the mercury, a toothed rack, a pinion engaging such rack, guide-rolls also engaging such rack to preserve its alignment with such pinion, a frame supporting such pinion and guide-rolls, a graduated dial, a pointer for such dial, such pointer connected with the pinion, substantially as shown, a wire connecting the toothed rack with the float, an oleaginous packing-chamber to resist the pressure of water from the reservoir, through which chamber the wire passes, such chamber connected to the reservoir, substantially as shown, and a counter-balance for such float, such counter-balance also attached to the toothed rack by means of a wire or other flexible connection, such wire passing over a frictionless pulley placed above such rack.

8. An improvement in mercury columns of the character described, consisting of a packing case or tube constructed substantially as described, such packing-case filled with an oleaginous substance consisting of lard and vaseline arranged in alternate layers within such packing-case, and stuffing-boxes placed one on each end of such packing-case, such packing-case embracing the wire connecting the float with the recording mechanism, substantially as set forth.

9. The combination, in a mercury column, of a reservoir containing a volume of mercury, a float balanced in such mercury, a tube connected with the interior of such reservoir, substantially as shown, through which tube the mercury ascends from the reservoir under water-pressure applied to such reservoir, a tube or packing-case attached to such reservoir, substantially as shown, recording mechanism for registering the height of mercury in the mercury-tube, and a wire connecting the float with the recording mechanism, such wire passing through the packing-case, such case filled with an oleaginous substance consisting of lard and vaseline placed in alternate layers within such packing-case.

Signed at New York, in the county of New York and State of New York, this 4th day of March, A. D. 1891.

ALMON B. CALKINS.

Witnesses:
CHAS. A. RILEY,
WILLIAM MOLLOY.